US011853611B2

(12) United States Patent
Veluswamy

(10) Patent No.: US 11,853,611 B2
(45) Date of Patent: Dec. 26, 2023

(54) NETWORK INTERFACE CARD IMPLEMENTING COMPOSITE ZONED NAMESPACE ARCHITECTURE

(71) Applicant: Western Digital Technologies, Inc., San Jose, CA (US)

(72) Inventor: Senthil Kumar Veluswamy, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/694,244

(22) Filed: Mar. 14, 2022

(65) Prior Publication Data
US 2023/0289100 A1    Sep. 14, 2023

(51) Int. Cl.
*G06F 3/06*    (2006.01)

(52) U.S. Cl.
CPC .......... *G06F 3/0659* (2013.01); *G06F 3/0604* (2013.01); *G06F 3/067* (2013.01); *G06F 3/0644* (2013.01)

(58) Field of Classification Search
None
See application file for complete search history.

(56) References Cited

U.S. PATENT DOCUMENTS

| | | | |
|---|---|---|---|
| 11,126,378 B1* | 9/2021 | Parker | G06F 11/1068 |
| 2002/0145907 A1 | 10/2002 | Byeon | |
| 2008/0005399 A1 | 1/2008 | Gruber et al. | |
| 2017/0228188 A1 | 8/2017 | Hassani et al. | |
| 2021/0019270 A1 | 1/2021 | Ll et al. | |
| 2021/0157720 A1 | 5/2021 | Bert | |
| 2021/0173588 A1* | 6/2021 | Kannan | G06F 3/0659 |
| 2021/0263674 A1 | 8/2021 | Shin et al. | |
| 2021/0286517 A1 | 9/2021 | Karr et al. | |
| 2021/0326048 A1 | 10/2021 | Karr | |
| 2021/0334215 A1 | 10/2021 | Gole et al. | |
| 2022/0300195 A1 | 9/2022 | Bert | |
| 2022/0317879 A1* | 10/2022 | Lin | G06F 3/0631 |

* cited by examiner

*Primary Examiner* — Brian R Peugh
(74) *Attorney, Agent, or Firm* — Michael Best & Friedrich LLP

(57) ABSTRACT

Systems, methods, and non-transitory computer-readable media for providing a network interface card implementing a C-ZNS architecture. The network interface card including an electronic processor configured to identify two or more host applications configured to access a storage device connected to the network interface card, divide the storage device into a plurality of zones, wherein each zone is associated with one of the two or more host applications, receive, from one of the two or more host applications, a command to write data to the storage device, and write the data into the zone associated with the one of the two or more host applications.

19 Claims, 12 Drawing Sheets

NETWORK INTERFACE CARD IMPLEMENTING COMPOSITE ZONED NAMESPACE ARCHITECTURE

FIELD OF DISCLOSURE

Embodiments described herein relate to cloud storage devices, and in particular, cloud storage devices and components of cloud storage devices implementing composite zoned namespace architecture.

SUMMARY

In contemporary cloud storage infrastructure, most hyper-scalars are using hard-disk drive (HDD) based storage devices, as HDD's cost per GB of storage is low, and can be made with higher capacity drives. Recently, with flash memory technology, solid-state drives (SSD) are becoming more efficient in terms of capacity and performance. More specifically, NVMe-based SSDs are giving far better input/output operations per second (IOPS) with very low latency as compared to HDDs. The cost of NVMe-SSDs is constantly reducing. Therefore, hyper-scalars are more interested in replacing legacy HDD based storage arrays with NVMe-SSD based All-Flash-Arrays (AFAs). However, there are some obstacles to the adoption of NVMe-SSD AFAs, such as the time to complete garbage collection (GC) processes, leading to unpredictability in NVMe-SSDs. Due to this unpredictability, NVMe-SSDs cannot promise predictable performance to host applications. As cloud storage performance is not predictable to host applications, hyper-scalars cannot be prepared with a mitigation plan if performance drops due to an SSD's GC process, leading hyper-scalars to slow down the adoption of NVMe-SSD AFAs.

To give better control to hyper-scalars, hyper-scalars may use Zoned NameSpace (ZNS), where no GC process will be executed within SSD, if the write input/outputs (I/Os) are always sequential from a host application. In other words, the ZNS SSDs expect the host application(s) to always perform sequential writes, providing constant predictable performance. However, some ZNS SSDs typically supports a maximum of 14 active zones. If a host application requests a 15th zone, the host application needs to close one of the current active zones, creating extra work for the host application. Additionally, the zone size may be fixed, such as to 1 GB per zone, so that if the host application requests to write more than 1 GB, an active zone needs to be closed. Furthermore, if any accidental, or "random," writes occur, the ZNS SSD may experience reduced performance. As cloud storage devices begin to include more SSD devices, these limitations increase. For example, a device with eight SSDs with face eight times as many errors due to the above limitations.

Therefore, to overcome the limitations of ZNS SSD, "Composite Zoned Name-Space" (C-ZNS) may be implemented within the existing software architecture of cloud storage devices to address the limitations of ZNS SSDs. Embodiments described herein provide systems and methods for implementing the C-ZNS architecture in cloud storage devices.

In particular, embodiments described herein provide a network interface card implementing C-ZNS architecture. The network interface card includes an electronic processor configured to identify two or more host applications configured to access a storage device connected to the network interface card, divide the storage device into a plurality of zones, wherein each zone is associated with one of the two or more host applications, receive, from one of the two or more host applications, a command to write data to the storage device, and write the data into the zone associated with the one of the two or more host applications.

Other embodiments described herein provide a method of managing a memory. The method includes identifying, with an SSD controller, two or more host applications configured to access the memory. The method includes dividing, with the SSD controller, the memory into a plurality of zones, wherein each zone is associated with one of the one or more host applications. The method includes receiving, with the SSD controller from one of the two or more host applications, a command to write data to the memory. The method also includes writing, with the SSD controller, the data into the zone associated with the one of the two or more host applications.

Further embodiments described herein provide a non-transitory computer-readable medium comprising a set of instructions that, when executed by an SSD controller, cause the SSD controller to perform a set of operations. The set of operations includes identifying two or more host applications configured to access the memory. The set of operations includes dividing the memory into a plurality of zones, wherein each zone is associated with one of the one or more host applications. The set of operations includes receiving, from one of the two or more host applications, a command to write data to the memory. The set of operations also includes writing the data into the zone associated with the one of the two or more host applications.

Other aspects of the disclosure will become apparent by consideration of the detailed description and accompanying drawings.

DETAILED DESCRIPTION

Figure 1:
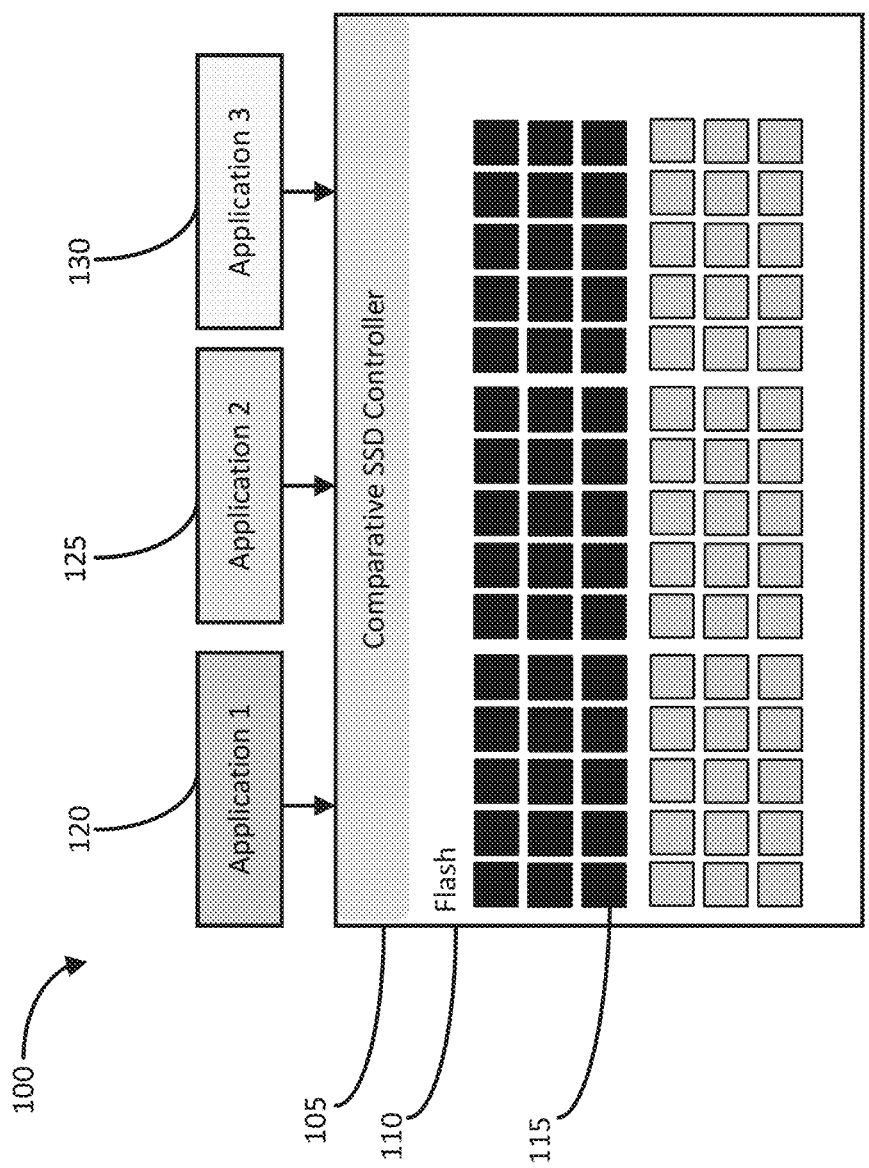
FIG. 1 is a block diagram of an SSD controller, according to some aspects of the present disclosure.

One or more embodiments and various aspects are described and illustrated in the following description and accompanying drawings. These embodiments, examples, and aspects are not limited to the specific details provided herein and may be modified or combined in various ways. Furthermore, other embodiments, examples, and aspects may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Also, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

FIG. 1 is a block diagram of a system 100 including a comparative a solid-state drive (SSD) controller 105, according to various aspects of the present disclosure. The comparative SSD controller 105 includes a flash memory portion 110. The flash memory portion 110 includes a plurality of blocks 115 to which incoming data can be written and from which data can be read. The incoming data may be received by the comparative SSD controller 105 from a host application connected to the comparative SSD controller 105, for example, from a first application 120, a second application 125, or a third application 130. Similarly, the data stored in the blocks 115 may be read by one of the first application 120, the second application 125, or the third application 130. In some embodiments, the placement of the data written to the flash memory portion 110 (that is, the specific block of the plurality of blocks 115 to which data is written) is controlled by the comparative SSD controller 105 itself.

However, this may create some issues. For example, the comparative SSD controller 105 may include a process called "Garbage Collection" (GC), during which bad (i.e., corrupted) blocks are collected and segregated. The GC process may begin at any time and, during the GC process, the input/output operations per second (IOPS) to the host applications may be impacted until the GC process is completed. Furthermore, there is no fixed time for the GC process to be completed, several factors may determine how long the GC process may be performed, varying on a GC-cycle-to-another-GC-cycle basis.

Figure 2:
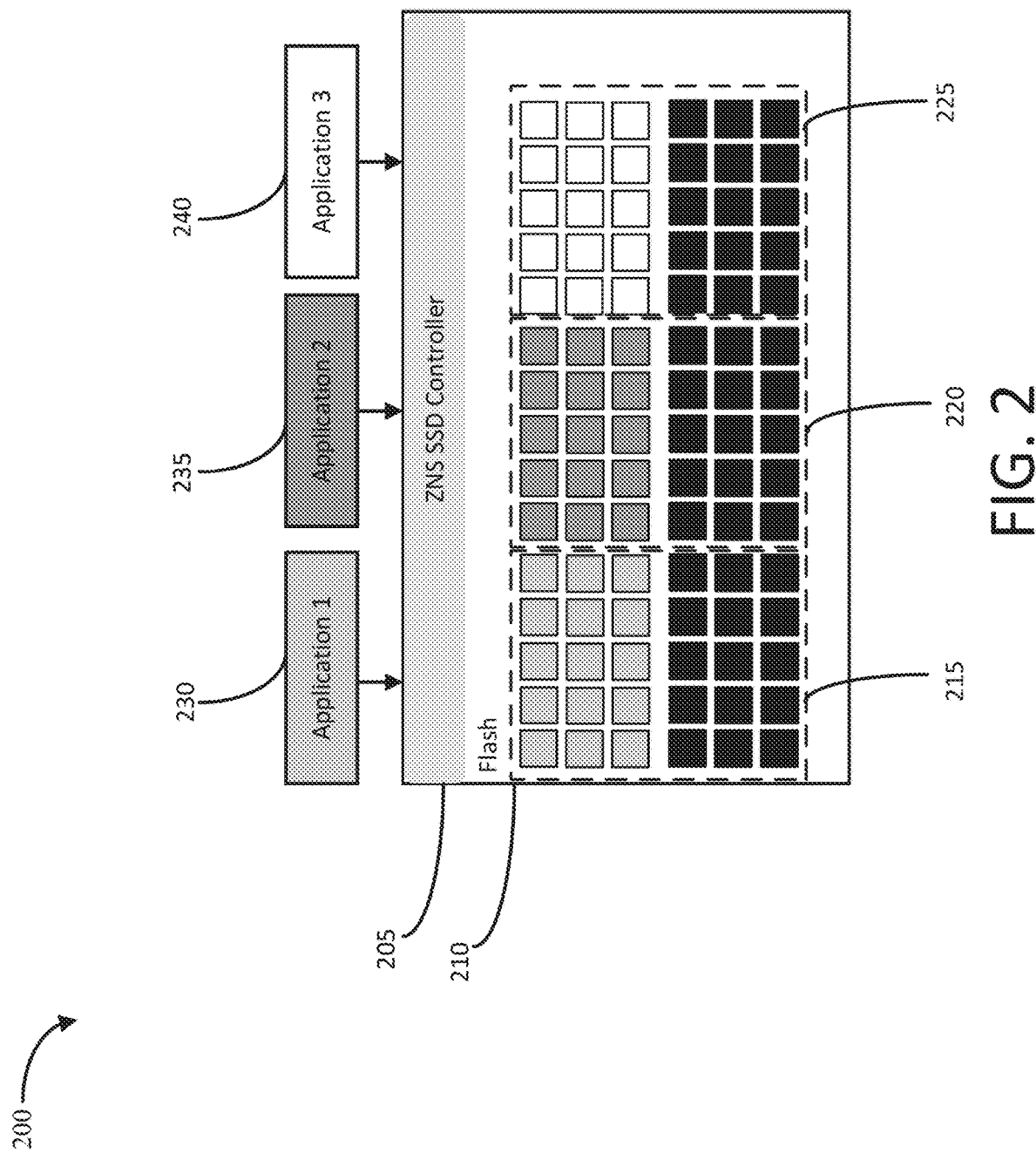
FIG. 2 is a block diagram of an SSD controller implementing composite zoned namespace (C-ZNS) architecture, according to some aspects of the present disclosure.

To remedy this issue, a composite zoned namespace (C-ZNS) architecture may be implemented. FIG. 2 is a block diagram of a system 200 including an SSD controller 205 implementing a C-ZNS architecture. Like the comparative SSD controller 105, the C-ZNS SSD controller 205 includes a flash memory portion 210. However, in contrast to the single plurality of blocks 115 of the comparative SSD controller 105, the C-ZNS SSD controller 205 includes a first plurality of blocks 215, a second plurality of blocks 220, and a third plurality of blocks 225. Incoming data can be written to each of the first plurality of blocks 215, the second plurality of blocks 220, and the third plurality of blocks 225, and similarly data can be read from each of the first plurality of blocks 215, the second plurality of blocks 220, and the third plurality of blocks 225. In particular, the incoming data may be received by the C-ZNS SSD controller 205 from a host application connected to the C-ZNS SSD controller 205, for example, from a first application 230, a second application 235, or a third application 240. However, unlike the comparative SSD controller 105, the C-ZNS SSD controller 205 may only write data received from the first application 230 to the first plurality of blocks 215, data received from the second application 235 to the second plurality of blocks 220, and data received from the third application 240 to the third plurality of blocks 225. With C-ZNS architecture, write I/Os are always sequential from a host application, allowing for the C-ZNS SSD controller 205 perform as expected.

Figure 3:
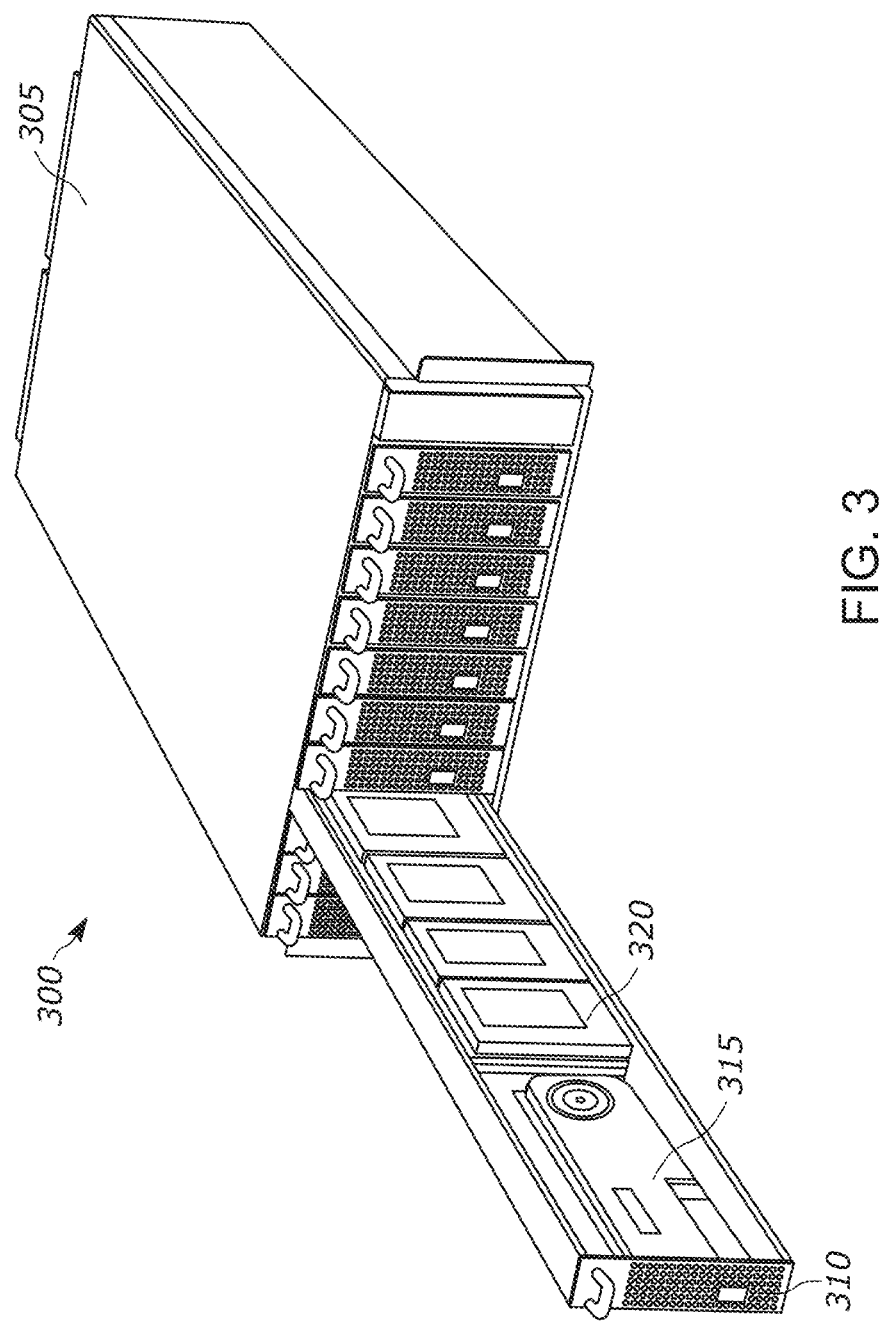
FIG. 3 is a perspective view of a first cloud storage device implementing a network interface card having the SSD controller of FIG. 2, according to some aspects of the present disclosure.

The SSD controller 205 may be implemented in a network interface card (NIC). FIG. 3 is a perspective view of a first cloud storage device 300 implementing a network interface card 315 having the SSD controller 205 of FIG. 2. The first cloud storage device 300 includes a housing 305 capable of storing a plurality of blades 310. Each blade 310 includes a network interface card 315 and a plurality of SSD devices 320. For example, the first cloud storage device 300 includes twelve blades 310, with each blade 310 including eight SSD devices 320.

Figure 4:
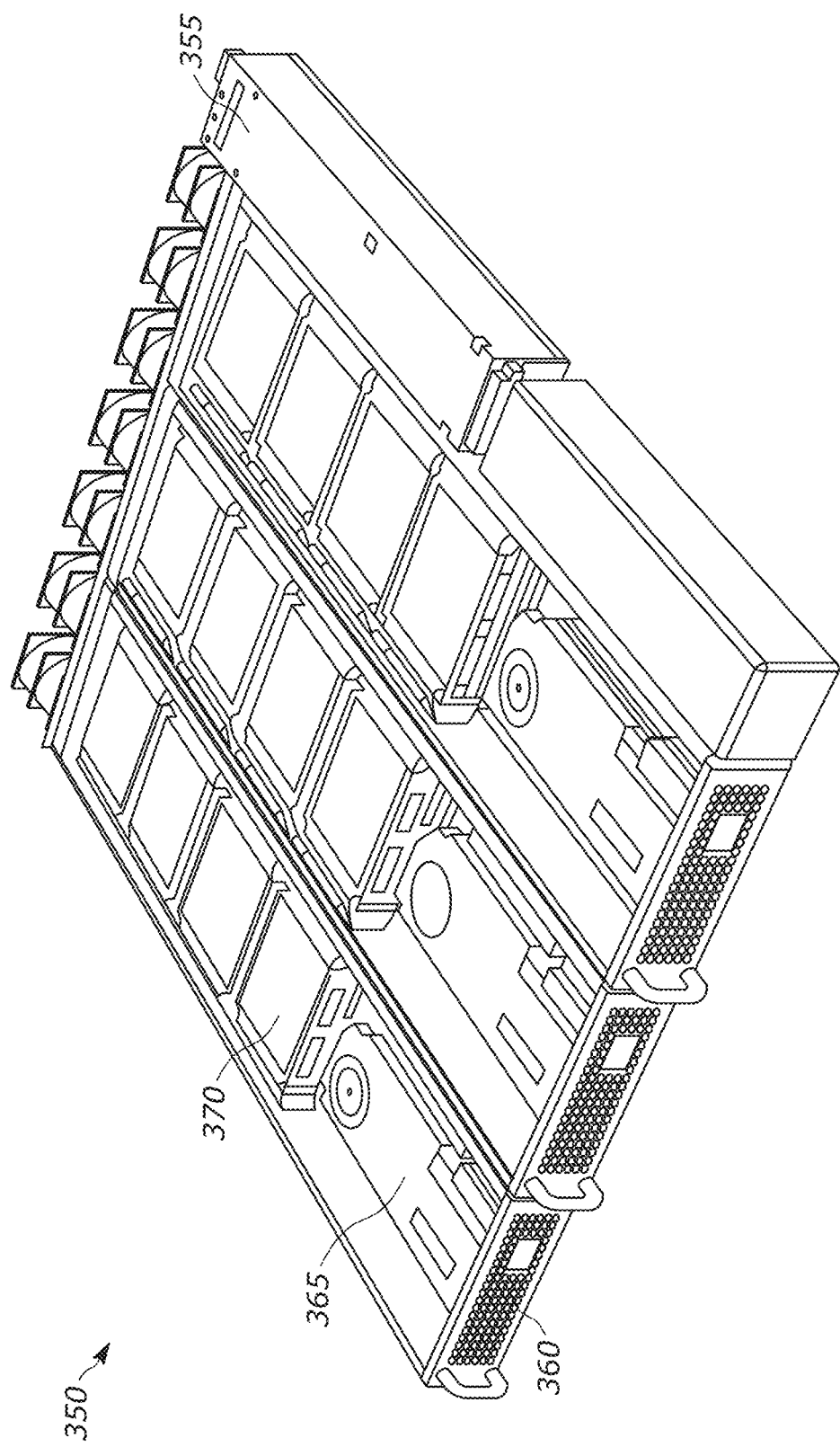
FIG. 4 is a perspective view of a second cloud storage device implementing a network interface card having the SSD controller of FIG. 2, according to some aspects of the present disclosure.

An alternative design of the cloud storage device is shown in FIG. 4. FIG. 4 is a perspective view of a second cloud storage device 350 implementing a network interface card 365 having the SSD controller 205 of FIG. 2. The second cloud storage device 350 includes connection portion 355 capable of linking a plurality of blades 360. Each blade 360 includes a network interface card 365 and a plurality of SSD devices 370. For example, the second cloud storage device 350 includes three blades 360, with each blade 360 including eight SSD devices 370.

Figure 5:
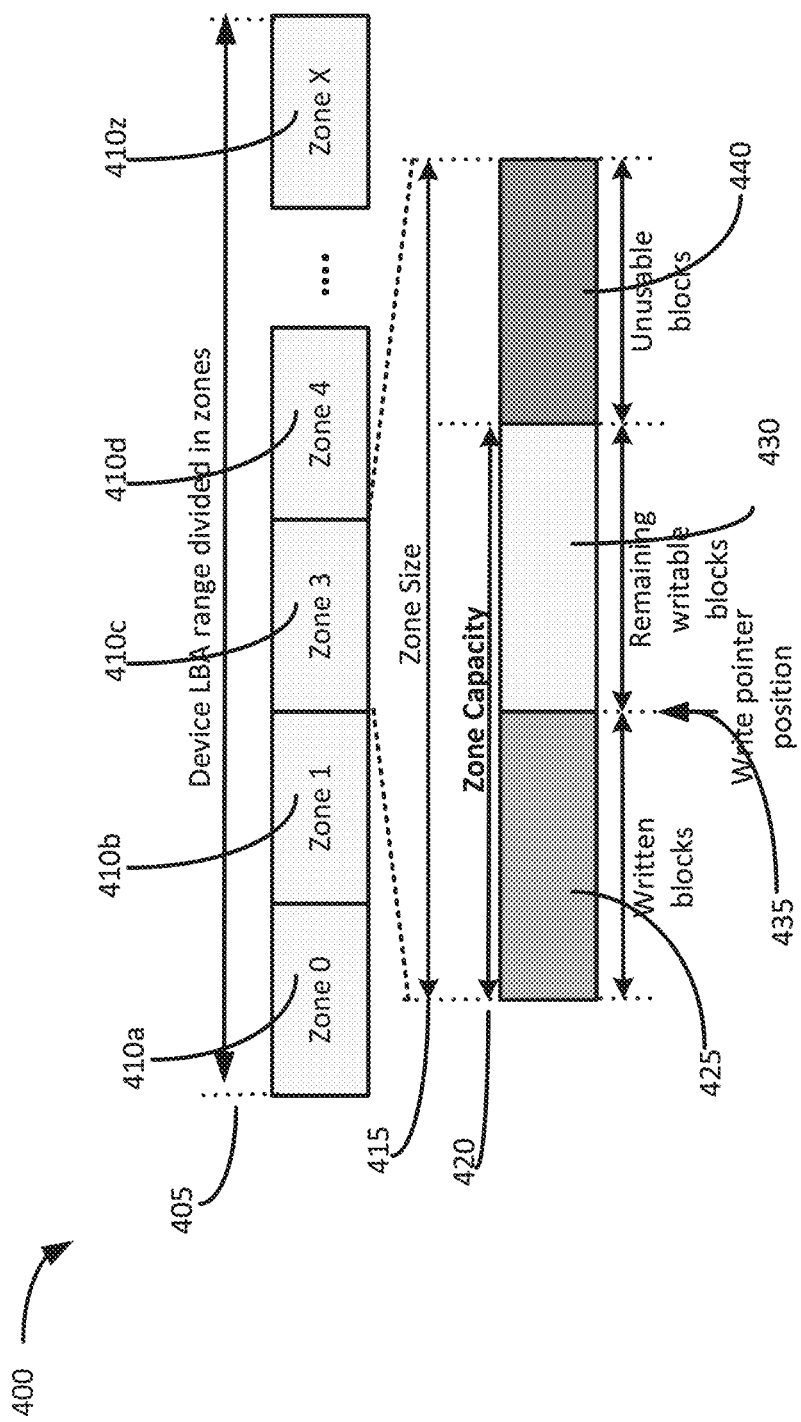
FIG. 5 is a diagram of a zone within the SSD controller of FIG. 2, according to some aspects of the present disclosure.

FIG. 5 is a diagram of a plurality of zones 410 of a C-ZNS architecture 400. In the C-ZNS architecture 400, a total device storage area 405 is broken up into the plurality of zones 410. The plurality of zones 410 are numbered sequentially from zero and may include any number of zones. For example, the C-ZNS architecture 400 includes zone 0 410a, zone 1 410b, zone 3 410c, and zone 4 410d, and may include up to zone X 410x. Each zone 410 includes a total zone size 415, which further includes a total capacity 420. The total capacity 420 includes the written blocks 425 and the remaining writable blocks 430 separated by a write pointer 435, while the total zone size 415 includes the total capacity 420 and unusable blocks 440.

Figure 6:
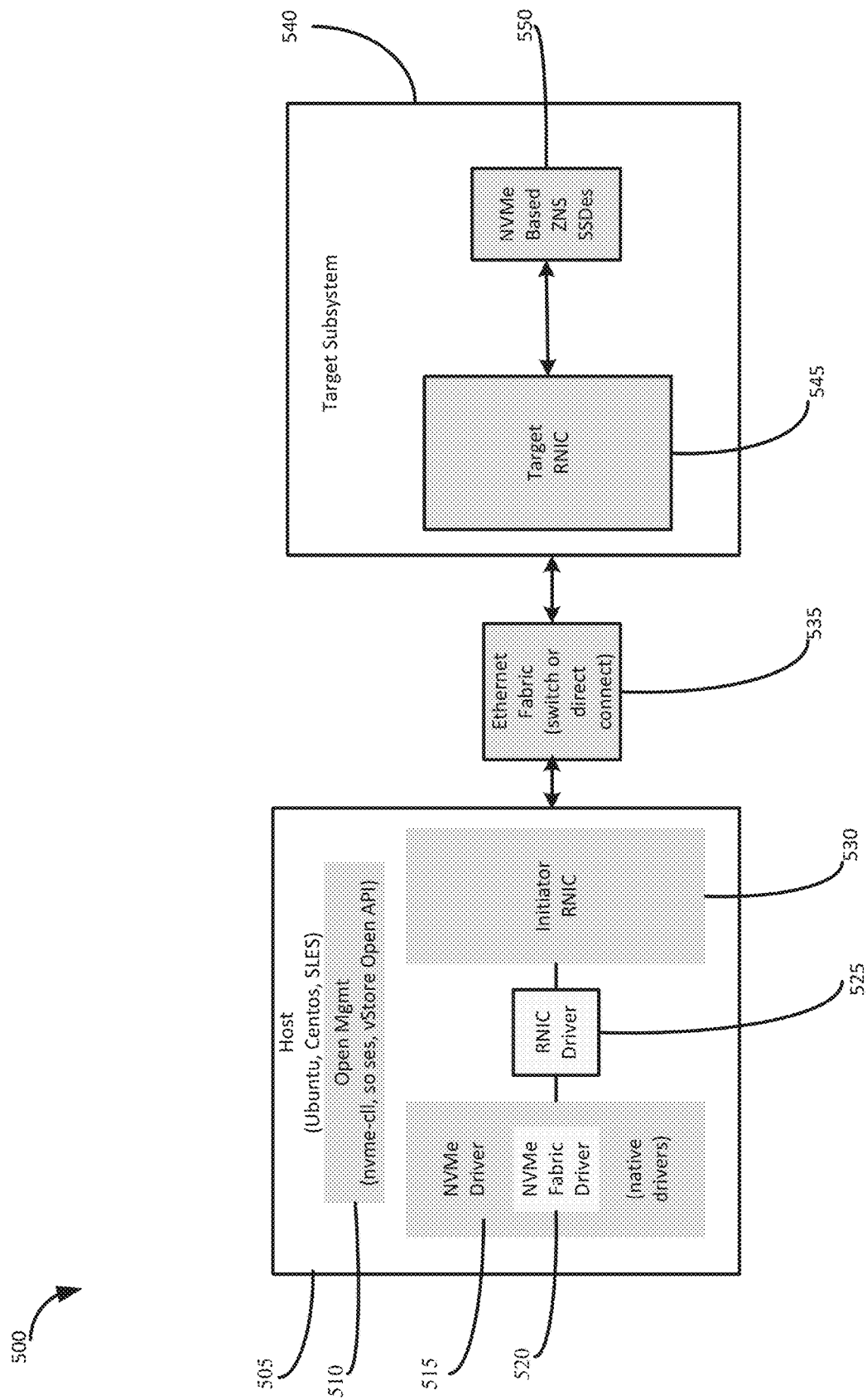
FIG. 6 is a block diagram of a cloud storage device implementing the SSD controller of FIG. 2, according to some aspects of the present disclosure.

FIG. 6 is a block diagram of system 500 including a cloud storage device (such as the first cloud storage device 300 or the second cloud storage device 350) implementing a C-ZNS architecture (such as the C-ZNS architecture 400). The system 500 includes a host device 505 including an open management program 510. The host device 505 also includes an NVMe driver 515 with an NVMe fabric driver 520. The NVMe driver 515 is connected to an RNIC driver 525, which in turn connects to an initiator RNIC 530. Both the RNIC driver 525 and the initiator RNIC 530 are part of the host device 505. The host device 505 is connected via the initiator RNIC 530 to an ethernet fabric 535 to a target subsystem 540. The target subsystem 540 (which may be one of the first or second cloud storage devices 300 or 350) includes a target RNIC 545 (i.e., NIC 315 or 365) which is connected to the ethernet fabric 535. The target RNIC 545 may implement the C-ZNS architecture 400. Furthermore, the target RNIC 545 may include one or more DRAM modules. The target RNIC 545 is also connected to one or more NVMe based ZNS SSDs 550 (i.e., SSD devices 320 or 370) of the target subsystem 540.

Figure 7:
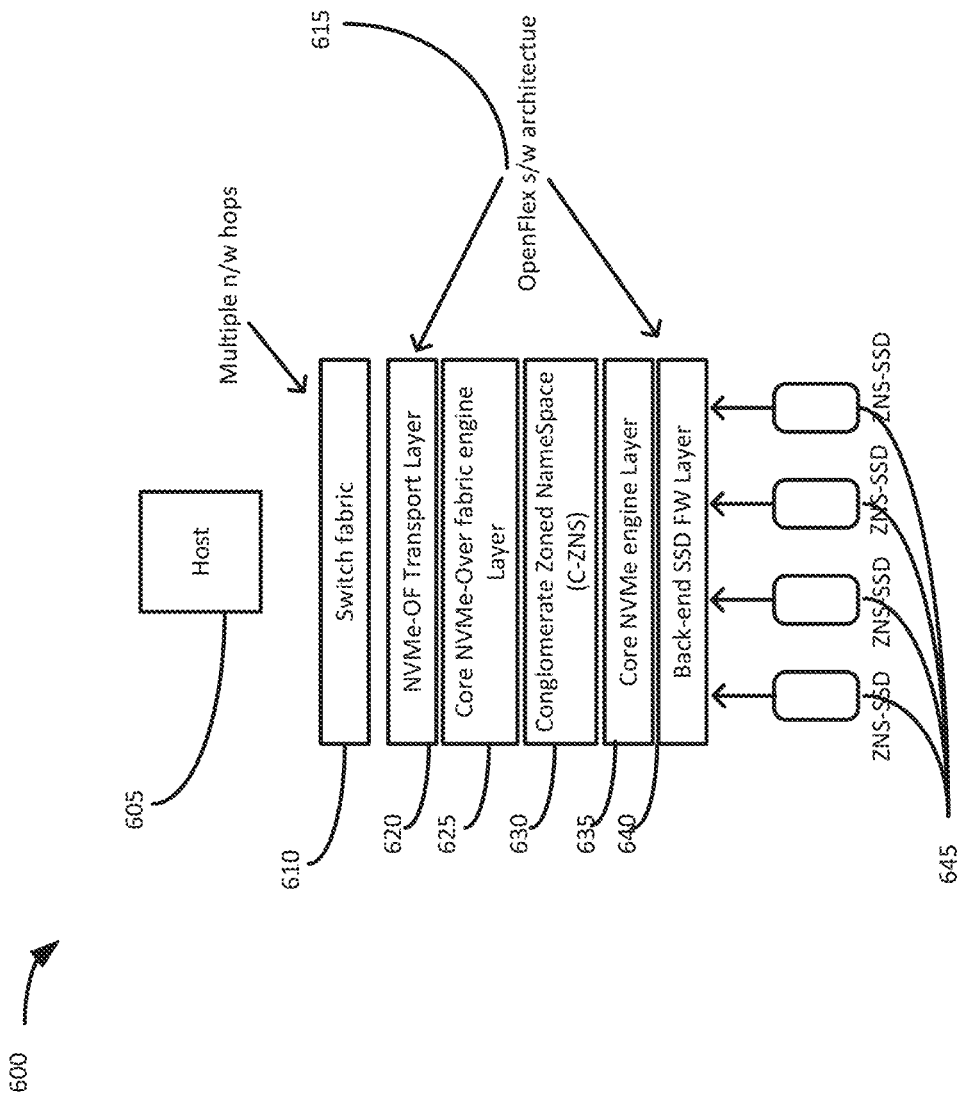
FIG. 7 is a block diagram of C-ZNS software architecture, according to some aspects of the present disclosure.

FIG. 7 is a block diagram of a system 600 implementing C-ZNS software architecture. A host device 605 is connected via a switch fabric 610 to a device implementing an OpenFlex architecture 615, such as the network interface card 315 or 365 of the first or second cloud storage device 300 or 350. The OpenFlex architecture 615 includes multiple sequential layers, such as an NVMe-OF (NVMe-Over Fabric) transport layer 620, a core NVMe-OF engine layer 625, a C-ZNS layer 630, a core NVMe layer 635, and a back-end SSD FW layer 640. The C-ZNS layer 630 allows the implementation of the C-ZNS architecture 400. In particular, the C-ZNS layer 630 includes one or more methods for implementing C-ZNS architecture 400 discussed in greater detail below with respect to FIGS. 8-12. The OpenFlex architecture 615 connects to one or more ZNS SSDs 645 through these layers. For example, the ZNS SSDs may be the SSD devices 320 or 370. In some embodiments, the host device 605 may include the first host application 230, the second host application 235, and the third host application 240.

Figure 8:
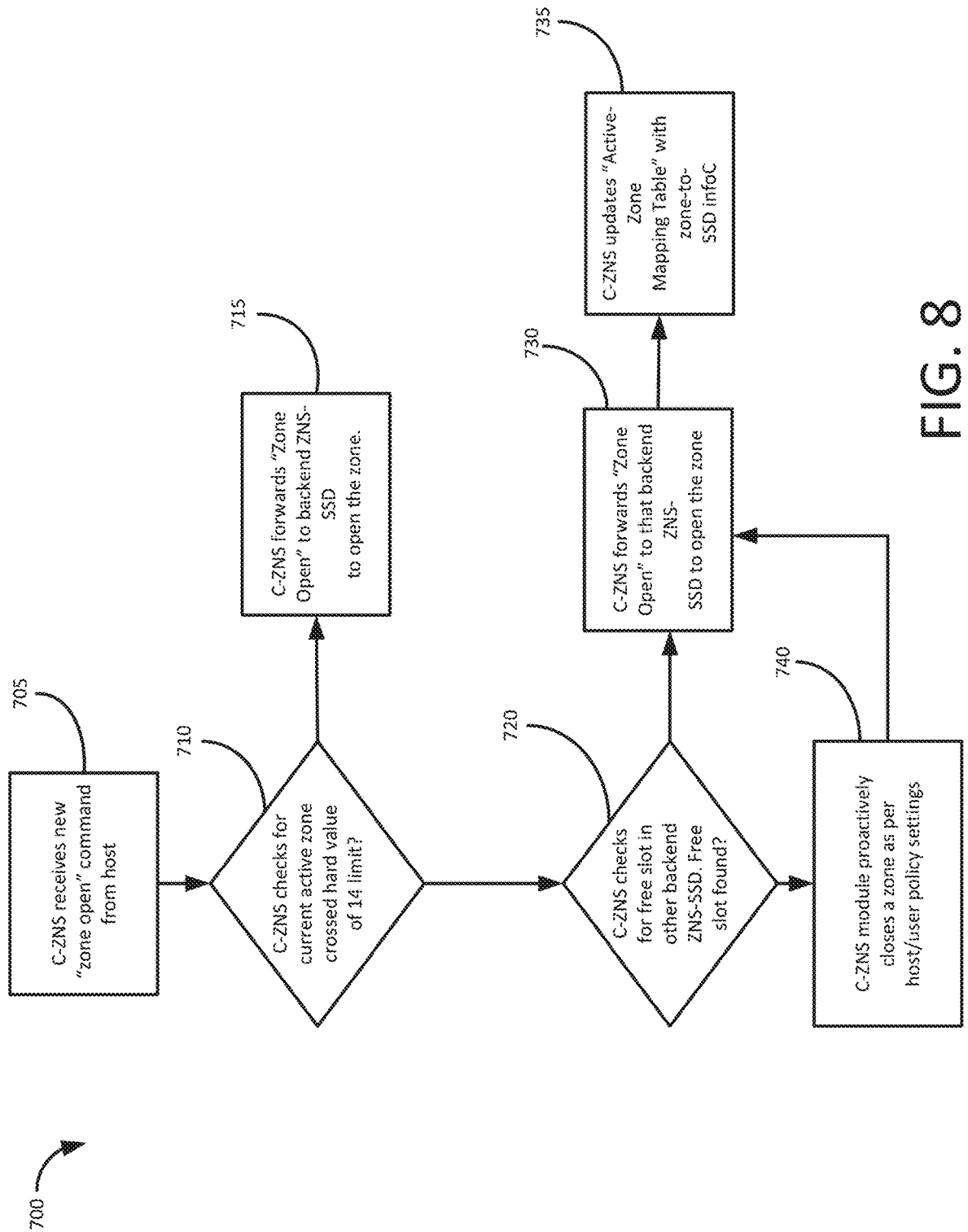
FIG. 8 is a flowchart illustrating a method of handling a C-ZNS active zone limit, according to some aspects of the present disclosure.

While implementing the C-ZNS architecture 400 improves the efficiency of data storage procedures, it may also necessitate methods for handling situations in which a number of active zones assigned to a host application exceeds a limit. FIG. 8 is a flowchart illustrating a method 700 of handling a C-ZNS active zone limit. The method 700 includes receiving a new "Zone Open" command to activate a new zone from a host (at block 705). For example, the C-ZNS SSD controller 205 receives a new "Zone Open" command to activate a new zone from a host application, such as the first host application 230, the second host application 235, or the third host application 240, from a host device.

The method 700 also includes checking whether the current number of active zones exceeds a predetermined number of active zones (at decision block 710). In some embodiments, the predetermined number is fourteen active zones. For example, the C-ZNS SSD controller 205 checks whether the current number of active zones exceeds fourteen active zones.

When there are fewer active zones than the predetermined number ("NO" at decision block 710), the method 700 includes forwarding the "Zone Open" command to a backend ZNS-SSD device (e.g., SSD device 320 or 370) to open the zone (at block 715). For example, responsive to the C-ZNS SSD controller 205 determining that there are less than or exactly fourteen active zones, the C-ZNS SSD controller 205 forwards the "Zone Open" command to a backend ZNS-SSD device, such as the SSD devices 320 or 370.

When the number of active zones exceeds the threshold, the method 700 includes checking for a free zone slot within other backend ZNS-SSD devices (at decision block 720). For example, responsive to the C-ZNS SSD controller 205 determining that there are more than fourteen active zones, the C-ZNS SSD controller 205 checks whether there is a free zone slot (i.e., less than fourteen active zones) within another SSD device 320 or 370.

When the C-ZNS finds a free slot, the method 700 includes forwarding the "Zone Open" command to the other backend ZNS-SSD device to open the zone (at block 730). For example, responsive to the C-ZNS SSD controller 205 finding a free slot in another SSD device 320 or 370, the C-ZNS SSD controller 205 forwards the "Zone Open" command to the other SSD device 320 or 370.

The method 700 also includes updating an "Active-Zone Mapping Table" with zone-to-SSD info (at block 735). The "Active-Zone Mapping Table" is a table that stores information relating to active zones across all connected ZNS SSD devices. For example, the C-ZNS SSD controller 205 updates an active-zone mapping table stored within the C-ZNS SSD controller 205.

Returning to block 725, when there is no free slot ("NO" at decision block 720), the method 700 includes proactively closing a zone as per host/user policy settings (at block 740). The method 700 then proceeds to block 730. The policy settings may be based on the least recently used zone, the most frequently used zone, the least priority zone, the least remaining capacity zone, etc. For example, responsive to the C-ZNS SSD controller 205 not finding a free slot in another SSD device 320 or the C-ZNS SSD controller 205 proactively closes a zone 410 as per host/user policy settings such as the least recently used zone, the most frequently used zone, the least priority zone, the least remaining capacity zone, etc. The C-ZNS SSD controller 205 then proceeds to block 730.

Figure 9:
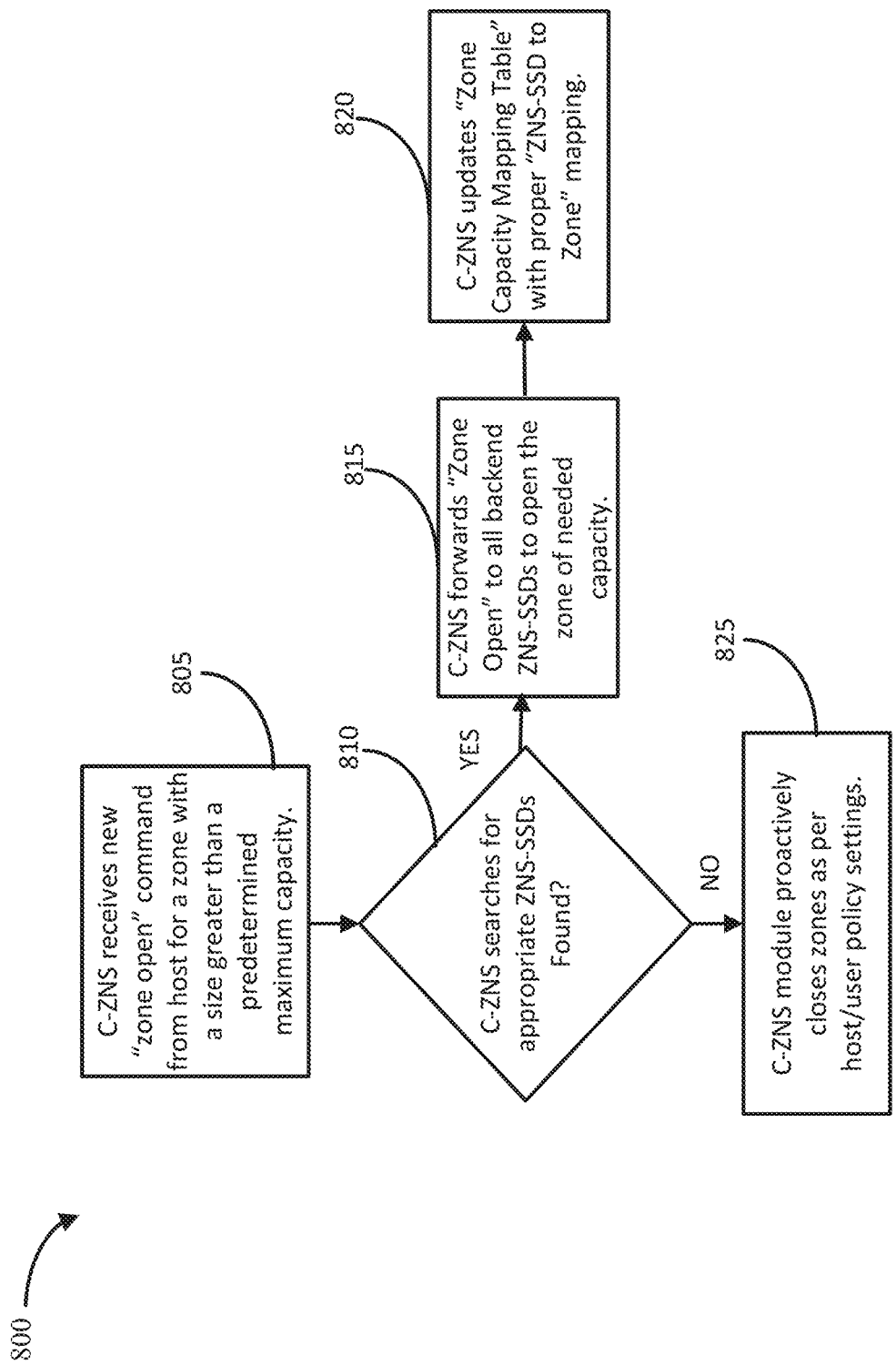
FIG. 9 is a flowchart illustrating a method of handling a C-ZNS zone capacity limit, according to some aspects of the present disclosure.

In addition to a limit of total number of active zones, devices implementing C-ZNS architecture (e.g., NIC 315 or 365) may also implement methods to handle situations in which a zone exceeds a size limit. FIG. 9 is a flowchart illustrating a method 800 of handling a C-ZNS zone capacity limit. The method 800 includes receiving a command from a host to create a zone with a size greater than a maximum zone size (at block 805). In some embodiments, the maximum zone size is one gigabyte. For example, the C-ZNS SSD controller 205 receives a new "Zone Open" command to activate a new zone from a host application, such as the first host application 230, the second host application 235, or the third host application 240, from a host with the desired size of the new zone being greater than one gigabyte.

The method 800 then includes searching for one or more appropriate ZNS-SSD(s) (at decision block 810). When one (or more) is found, the method 800 includes forwarding the "Zone Open" command to all backend ZNS-SSDs to open the zone of needed capacity (at block 815). For example, responsive to the C-ZNS SSD controller 205 finding one or more appropriate ZNS-SSD(s), the C-ZNS SSD controller 205 forwards the "Zone Open" command to all SSD devices 320 or 370 necessary to open the zone of needed capacity.

The method 800 then includes updating the "Zone Capacity Mapping Table" with proper "ZNS-SSD to Zone" mapping (at block 820). For example, the C-ZNS SSD controller 205 updates an active-zone mapping table stored within the C-ZNS SSD controller 205.

Returning to decision block 810, when no appropriate ZNS-SSD is found ("NO" at decision block 810), the method 800 includes proactively closing zones as per host/user policy settings (at block 825). The method 800 then returns to decision block 810. For example, responsive to the C-ZNS SSD controller 205 not fining an appropriate ZNS-SSD, the C-ZNS SSD controller 205 proactively closes zones 410 as per host/user policy settings such as the least recently used zone, the most frequently used zone, the least priority zone, the least remaining capacity zone, or other suitable host/user policy settings.

Figure 10:
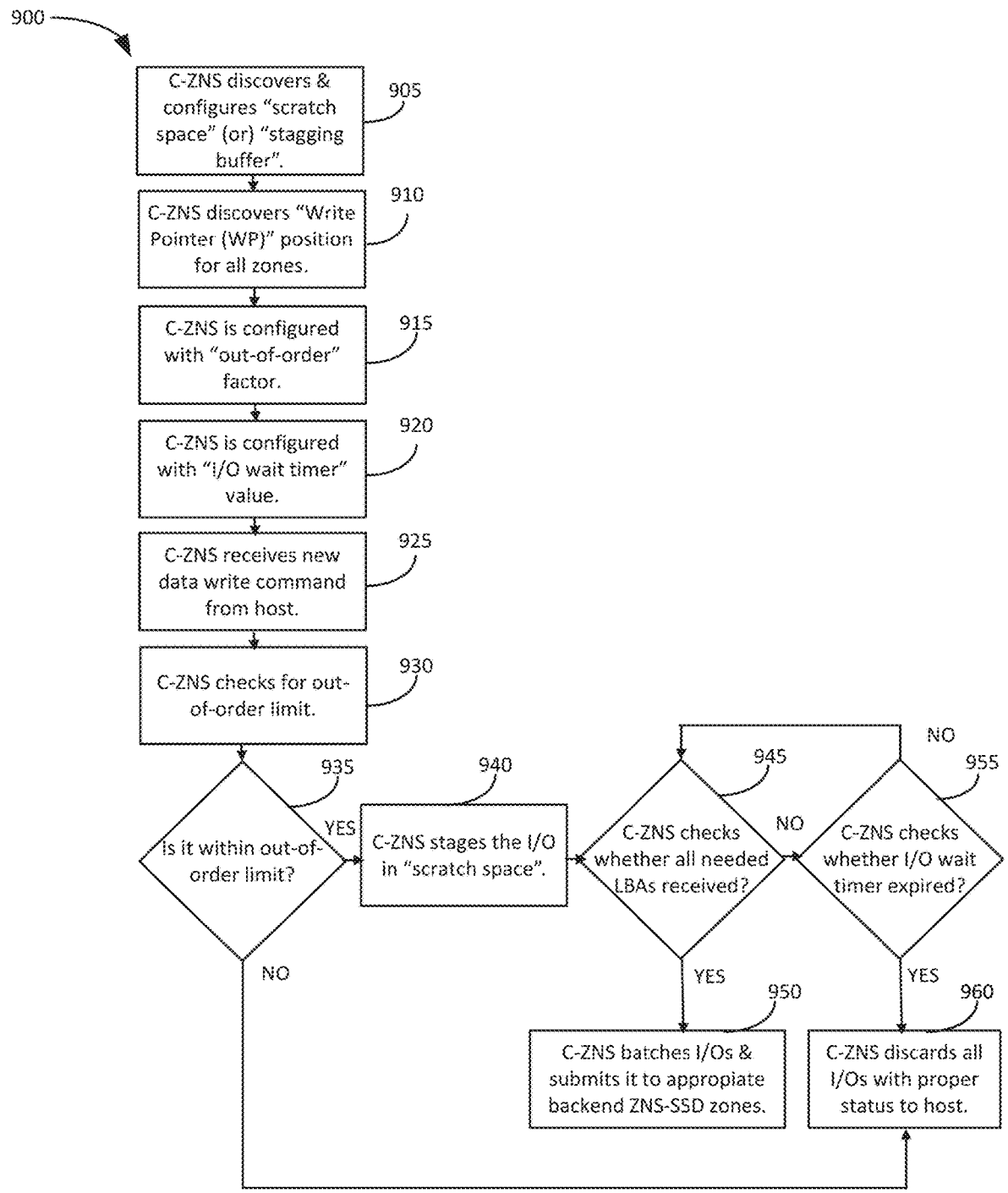
FIG. 10 is a flowchart illustrating a method of handling a C-ZNS out-of-order and/or random write error, according to some aspects of the present disclosure.

Furthermore, devices implementing C-ZNS architecture may require methods to handle out-of-order and/or random write errors. FIG. 10 is a flowchart illustrating a method 900 of handling an out-of-order and/or random write error. The method 900 includes allocating "scratch space" (i.e., a buffer) within storage, such as DRAM of a controller memory buffer (at block 905). For example, the C-ZNS SSD controller 205 (in this instance implemented in the target RNIC 545) allocates scratch space within a DRAM module of the target RNIC 545.

The method 900 includes identifying the position of a write pointer within each zone (at block 910). For example, the C-ZNS SSD controller 205 identifies the position of a write pointer 435 within each zone 215.

The method 900 includes determining an "out-of-order" factor (at block 915). In some embodiments, the out-of-order factor is a factor by which the C-ZNS device can determine that a zone has been written to out-of-order (i.e., non-sequentially). For example, the C-ZNS SSD controller 205 determines an "out-of-order" factor to determine that a zone has been written to out-of-order.

The method 900 includes determining an "I/O wait timer" value (at block 920). For example, the C-ZNS SSD controller 205 determines an "I/O wait timer" value based on C-ZNS SSD controller settings.

The method 900 also includes receiving a command from a host application to write to a zone (at block 925). For example, the C-ZNS SSD controller 205 receives a command from the first host application 230 to write to the corresponding zone 215.

The method 900 also includes checking whether the zone being written to is within an out-of-order limit based on the out-of-order factor (at block 930). For example, the C-ZNS SSD controller 205 checks whether the block within the zone 215 being written to is within an out-of-order limit based on the out-of-order factor.

When the I/O is within the out-of-order limit ("YES" at decision block 935), the method 900 includes staging the I/O within the scratch space (at block 940). For example, responsive to the C-ZNS SSD controller 205 determining that the I/O is within the out-of-order limit, the C-ZNS SSD controller 205 stages the I/O within the scratch space.

The method 900 includes checking whether all needed LBAs are received (at decision block 945). For example, the C-ZNS SSD controller 205 checks whether all needed LBAs are received.

When all needed LBAs are received ("YES" at decision block 945), the method 900 includes batching all I/Os and submitting the batch to appropriate ZNS-SSD zones to be written (at block 950). For example, responsive to the C-ZNS SSD controller 205 determining that all needed LBAs are received, the C-ZNS SSD controller 205 batches all I/Os and submits the batch to the appropriate zones 410.

Otherwise, when all needed LBAs have not been received ("NO" at decision block 945), the method 900 includes checking whether the I/O wait timer has expired (at decision block 955). For example, responsive to the C-ZNS SSD controller 205 determining that all needed LBAs have not been received, the C-ZNS SSD controller 205 checks whether the I/O wait timer has expired.

When the wait timer has not expired ("NO" at decision block 955), the method 900 returns to decision block 945 and again checks whether all needed LBAs are received. For example, responsive to the C-ZNS SSD controller 205 determining that the wait timer has not expired, the C-ZNS SSD controller 205 checks whether all needed LBAs are received.

Otherwise, when the wait timer has expired ("YES" at decision block 955), the method 900 includes discarding all I/Os and provides an error message to the host application (at block 960). For example, responsive to the C-ZNS SSD controller 205 determining that the wait timer has expired, the C-ZNS SSD controller 205 discards all I/Os and provides an error message to the host application 230.

Returning to decision block 935, when the I/Os are not within the out-of-order limit ("NO" at decision block 935), the method 900 proceeds directly to block 960. For example, responsive to the C-ZNS SSD controller 205 determining that the I/Os are not within the out-of-order limit, the C-ZNS SSD controller 205 discards all I/Os and provides an error message to the host application 230.

Figure 11:
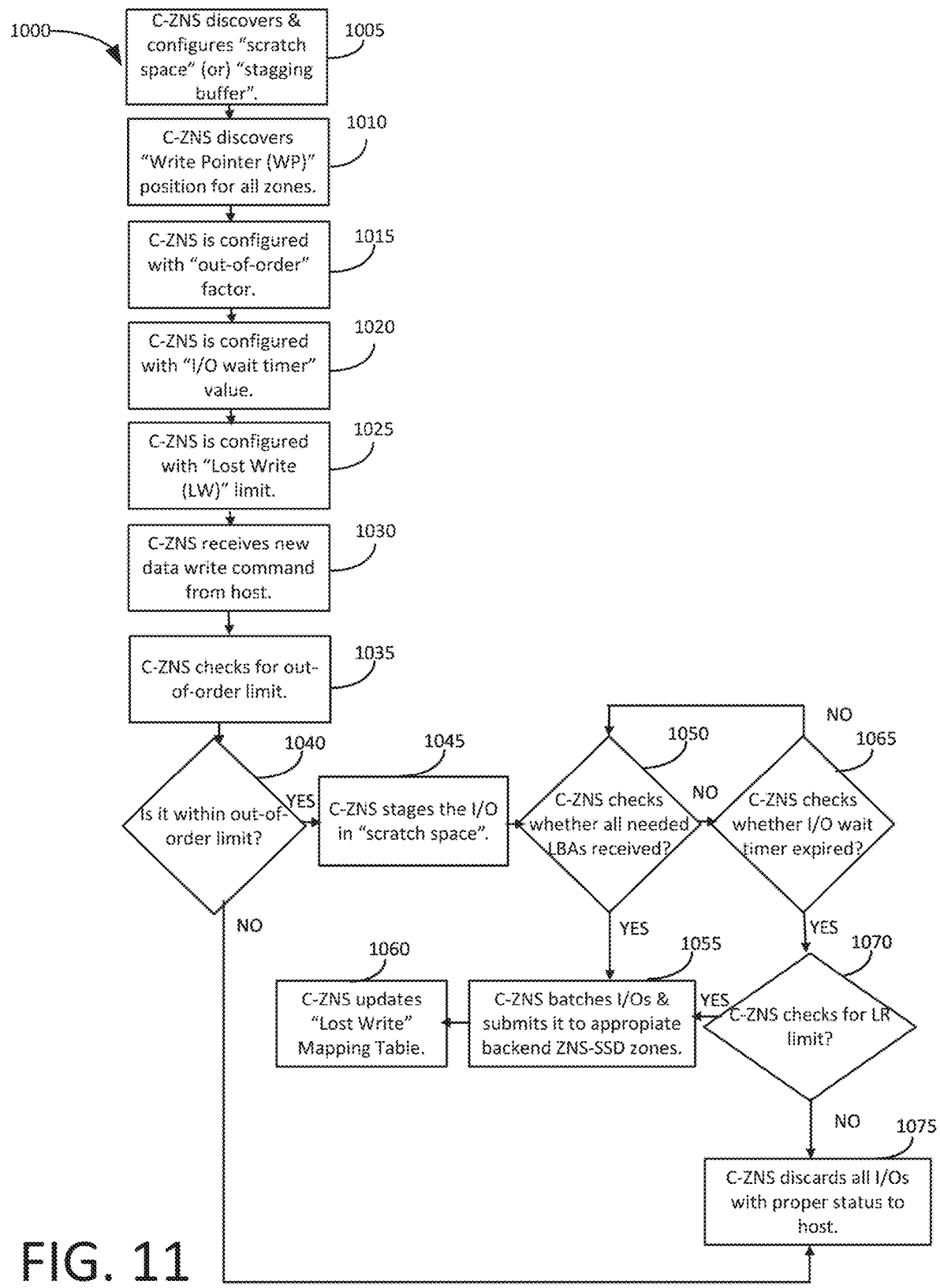
FIG. 11 is a flowchart illustrating a method of handling a C-ZNS lost write error, according to some aspects of the present disclosure.

Similarly, the C-ZNS device may require a method to handle a lost write error. FIG. 11 is a flowchart illustrating a method 1000 of handling a lost write error. The method 1000 includes allocating "scratch space" (i.e., a buffer) within the available storage (at block 1005). For example, the C-ZNS SSD controller 205 allocates "scratch space" within the available storage.

The method 1000 also includes identifying the position of a write pointer within each zone (at block 1010). For example, the C-ZNS SSD controller 205 identifies the position of a write pointer 435 within each zone 215.

The method 1000 also includes determining an "out-of-order" factor (at block 1015). In some embodiments, the out-of-order factor is a factor by which the C-ZNS device can determine that a zone has been written to out-of-order (i.e., non-sequentially). For example, the C-ZNS SSD controller 205 determines an "out-of-order" to determine that a zone has been written to out-of-order.

The method 1000 also includes determining an "I/O wait timer" value (at block 1020). For example, the C-ZNS SSD controller 205 determines an "I/O wait timer" value.

The method 1000 also includes determining a "Lost Write" limit (at block 1025). The lost write limit is a limit of "lost writes," or I/Os which may only include some data with the rest facing a significant delivery delay from the host application, which may be stored within the ZNS-SSD controller until the remaining data is received. For example, the C-ZNS SSD controller 205 determines a "Lost Write" limit.

The method 1000 also includes receiving a command from a host application to write to a zone (at block 1030). For example, the C-ZNS SSD controller 205 receives a command from the first host application 230 to write to the corresponding zone 215.

The method 1000 also includes checking whether the zone being written to is within an out-of-order limit based on the out-of-order factor (at block 1035). For example, the C-ZNS SSD controller 205 checks whether the block within the zone 215 being written to is within an out-of-order limit based on the out-of-order factor.

When the I/O is within the out-of-order limit ("YES" at decision block 1040), the method 1000 includes staging the I/O within the scratch space (at block 1045). For example, responsive to the C-ZNS SSD controller 205 determining that the I/O is within the out-of-order limit, the C-ZNS SSD controller 205 stages the I/O within the scratch space.

The method 1000 includes checking whether all needed LBAs are received (at decision block 1050). For example, the C-ZNS SSD controller 205 checks whether all needed LBAs are received.

When all needed LBAs are received ("YES" at decision block 1050), the method 1000 includes batching all I/Os and submitting the batch to appropriate ZNS-SSD zones to be written (at block 1055). For example, responsive to the C-ZNS SSD controller 205 determining that all needed LBAs are received, the C-ZNS SSD controller 205 batches all I/Os and submits the batch to the appropriate ZNS-SSD zones.

The method 1000 then includes updating a "lost write" mapping table (at block 1060). The "lost write" mapping table is a table in which data relating to "lost writes" is stored. For example, the C-ZNS SSD controller 205 updates a "lost write" mapping tables stored within the C-ZNS SSD controller 205

Otherwise, when all needed LBAs are not received ("NO" at decision block 1050), when all needed LBAs have not been received, the method 1000 includes checking whether the I/O wait timer has expired (at decision block 1065). For example, responsive to the C-ZNS SSD controller 205 determining that all needed LBAs are not received, the C-ZNS SSD controller 205 checks whether the I/O wait timer has expired.

When the wait timer has not expired ("NO" at decision block 1065), the method 1000 returns to decision block 1050 and again checks whether all LBAs are received. For example, responsive to the C-ZNS SSD controller 205 determining that the wait timer has not expired, the C-ZNS SSD controller 205 checks whether all needed LBAs are received.

Otherwise, when the wait timer has expired ("YES" at decision block 1065), the method 1000 includes checking whether the total number of stored "lost writes" is less than the lost write limit (at decision block 1070). For example, responsive to the C-ZNS SSD controller 205 determining that the wait timer has expired, the C-ZNS SSD controller 205 checks whether the total number of stored "lost writes" is less than the lost write limit.

When the total number of lost writes is less than the lost write limit ("YES" at decision block 1070), the method 1000 proceeds to block 1055 to store the partial write while awaiting the remaining data. For example, responsive to the C-ZNS SSD controller 205 determining that the total number of stored lost writes is less than the lost write limit, the C-ZNS SSD controller 205 stores the partial write while awaiting the remaining data.

Otherwise, when the total number of lost writes is greater than the lost write limit ("NO" at decision block 1070), the method 1000 includes discarding all I/Os and providing an error message to the host application (at block 1075). For example, responsive to the C-ZNS SSD controller 205 determining that the total number of lost writes is greater than the lost write limit, the C-ZNS SSD controller 205 discards all I/Os and provides an error message to the host application 230.

Returning to decision block 1040, when the I/Os are not within the out-of-order limit ("NO" at decision block 1040), the method 1000 proceeds directly to block 1075. For example, responsive to the C-ZNS SSD controller 205 determining that the I/Os are not within the out-of-order limit, the C-ZNS SSD controller 205 discards all I/Os and provides an error message to the host application 230.

Figure 12:
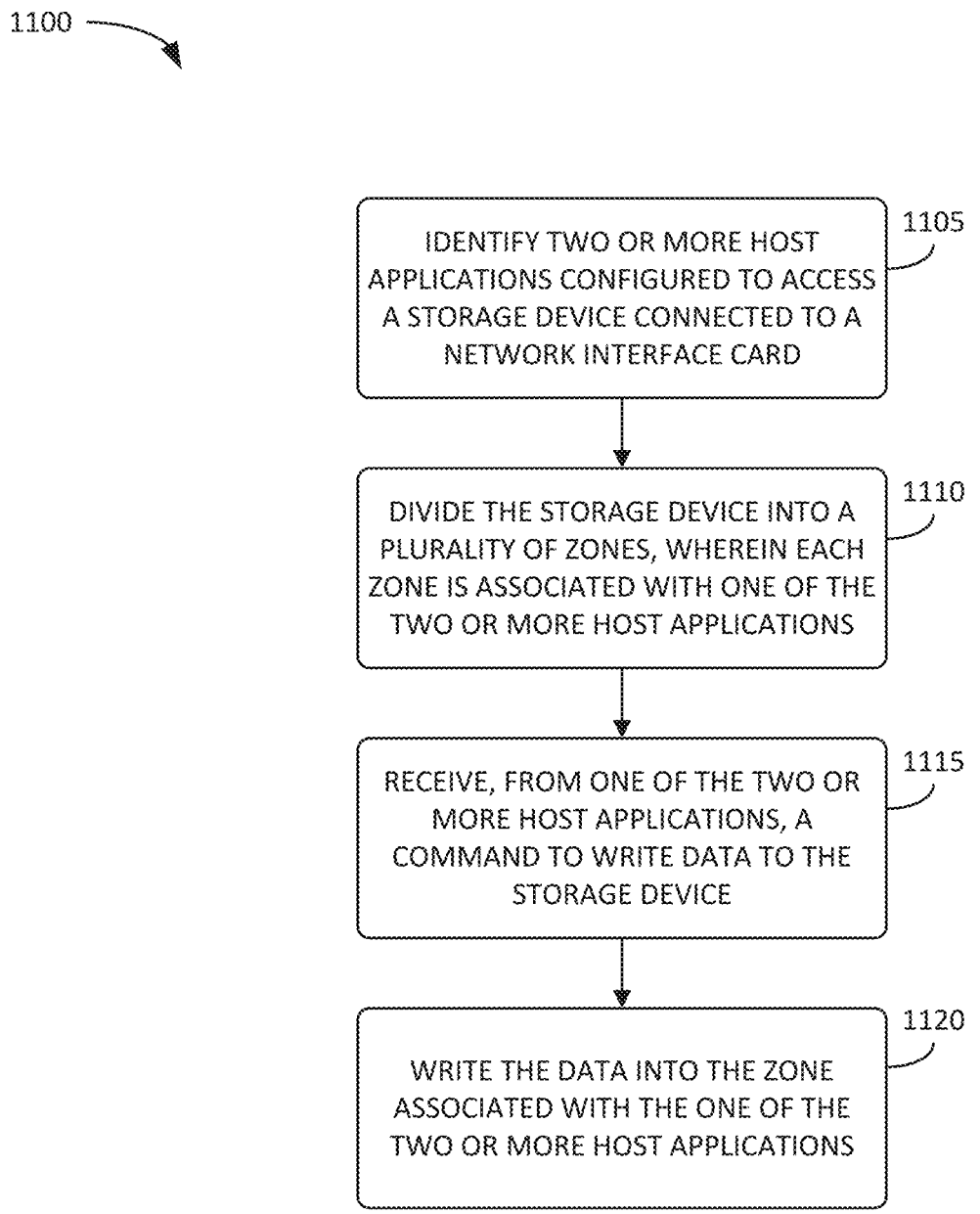
FIG. 12 is a flowchart illustrating a method of managing a memory device, according to some aspects of the present disclosure.

FIG. 12 is a flowchart illustrating a method 1100 of managing a memory device (for example, C-ZNS SSD device 320 or 370). The method 1100 includes identifying two or more host applications configured to access the memory device (at block 1105). The two or more host applications may be any of the first host application 230, the second host application 235, or the third host application 240. The method 1100 includes dividing the memory device into a plurality of zones, wherein each zone is associated with one of the one or more host applications (at block 1110).

The method 1100 includes receiving, from one of the two or more host applications, a command to write data to the memory device (at block 1115). The method 1100 also includes writing the data into the zone associated with the one of the two or more host applications. In some embodiments, any portion of the method 1100 may be performed by the C-ZNS SSD controller 205.

Various features and advantages of the embodiments and aspects described herein are set forth in the following claims.

What is claimed is:

1. A network interface card implementing a Composite Zoned Namespace (C-ZNS) architecture, the network interface card including:
   an electronic processor configured to:
      identify two or more host applications configured to access a storage device connected to the network interface card;
      divide the storage device into a plurality of zones, wherein each zone is associated with one of the two or more host applications;
      receive, from one of the two or more host applications, a command to write data to the storage device;
      write the data into the zone associated with the one of the two or more host applications; and
      receive a zone open command from one of the host applications; and determine whether a number of active zones within the storage device exceeds a maximum number of active zones.

2. The network interface card of claim 1, wherein writing the data includes selecting the zone based on a sequential order of the plurality of zones.

3. The network interface card of claim 1, wherein, to determine whether the number of active zones within the storage device exceeds the maximum number of active zones, the electronic processor is further configured to:
  check for a free zone slot in a second storage device connected to the network interface card;
  forward the zone open command to the second storage device; and
  update an active zone mapping table.

4. The network interface card of claim 1, wherein, to determine whether the number of active zones within the storage device exceeds the maximum number of active zones, the electronic processor is further configured to determine whether to close one or more zones based on a host policy.

5. The network interface card of claim 4, wherein, to determine whether to close the one or more zones based on the host policy, the electronic processor is further configured to determine whether to close the one or more zones based on a least recently used zone, a most frequently used zone, a least priority zone, or a least remaining capacity zone.

6. The network interface card of claim 1, wherein the maximum number of active zones is fourteen.

7. The network interface card of claim 1, wherein the electronic processor is further configured to:
  receive a zone open command from one of the two or more host applications to create a new zone within the storage device, the new zone exceeding a maximum size of a zone of the plurality of zones;
  determine whether the storage device has enough space to store the new zone;
  forward the zone open command to the storage device in response to determining that the storage device has the enough space to store the new zone; and
  update an active zone mapping table.

8. The network interface card of claim 7, wherein the maximum size of each of the zones of the plurality of zones is one gigabyte.

9. The network interface card of claim 1, further comprising a Composite Zoned Namespace software architecture layer.

10. A method of managing a memory, the method comprising:
  identifying, with an SSD controller, two or more host applications configured to access the memory;
  dividing, with the SSD controller, the memory into a plurality of zones, wherein each zone is associated with one of the one or more host applications;
  receiving, with the SSD controller from one of the two or more host applications, a command to write data to the memory;
  writing, with the SSD controller, the data into the zone associated with the one of the two or more host applications;
  receiving, with the SSD controller, a zone open command from one of the two or more host applications; and
  determining, with the SSD controller, whether a number of active zones within the storage device exceeds a maximum number of active zones.

11. The method of claim 10, wherein writing the data includes selecting the zone based on a sequential order of the plurality of zones.

12. The method of claim 10, wherein, to determine whether the number of active zones exceeds the maximum number of active zones within the storage device, the method further comprises:
  checking, with the SSD controller, for a free zone slot in a second memory;
  forwarding, with the SSD controller, the zone open command to the second memory; and
  updating, with the SSD controller, an active zone mapping table.

13. The method of claim 10, wherein, to determine whether the number of active zones exceeds the maximum number of active zones within the storage device, the method further comprises closing, with the SSD controller, one or more zones based on a host policy.

14. The method of claim 13, wherein to determine whether to close the one or more zones of the plurality of zones based on the host policy, the method further includes determining, with the SSD controller, whether to close the one or more zones based on a least recently used zone, a most frequently used zone, a least priority zone, or a least remaining capacity zone.

15. The method of claim 10, wherein the maximum number of active zones is fourteen.

16. The method of claim 10, further comprising:
  receiving, with the SSD controller, a command from one of the host applications to create a new zone within the memory, the new zone exceeding a maximum size of a zone within the plurality of zones;
  determining, with the SSD controller, whether the memory has enough space to store the new zone;
  forwarding, with the SSD controller, the zone open command to the memory in response to determining that the storage device has the enough space to store the new zone; and
  updating, with the SSD controller an active zone mapping table.

17. The method of claim 16, wherein the maximum size of a zone of the plurality of zones is one gigabyte.

18. A network interface card implementing a Composite Zoned Namespace (C-ZNS) architecture, the network interface card including:
  an electronic processor configured to:
    identify two or more host applications configured to access a storage device connected to the network interface card;
    divide the storage device into a plurality of zones, wherein each zone is associated with one of the two or more host applications;
    receive, from one of the two or more host applications, a command to write data to the storage device;
    write the data into the zone associated with the one of the two or more host applications;
    receive a zone open command from one of the two or more host applications to create a new zone within the storage device, the new zone exceeding a maximum size of a zone of the plurality of zones;
    determine whether the storage device has enough space to store the new zone;
    forward the zone open command to the storage device in response to determining that the storage device has the enough space to store the new zone; and
    update an active zone mapping table.

19. A method of managing a memory, the method comprising:
  identifying, with an SSD controller, two or more host applications configured to access the memory;
  dividing, with the SSD controller, the memory into a plurality of zones, wherein each zone is associated with one of the one or more host applications;

receiving, with the SSD controller from one of the two or more host applications, a command to write data to the memory;

writing, with the SSD controller, the data into the zone associated with the one of the two or more host application;

receiving, with the SSD controller, a command from one of the host applications to create a new zone within the memory, the new zone exceeding a maximum size of a zone within the plurality of zones;

determining, with the SSD controller, whether the memory has enough space to store the new zone;

forwarding, with the SSD controller, the zone open command to the memory in response to determining that the storage device has the enough space to store the new zone; and updating, with the SSD controller an active zone mapping table.

* * * * *